United States Patent
Witte et al.

(10) Patent No.: US 11,912,255 B2
(45) Date of Patent: Feb. 27, 2024

(54) ESTIMATION OF THE TEMPERATURE OF AN ELECTRIC MOTOR OF A VEHICLE BRAKE ACTUATOR AND CONTROL OF THE MOTOR

(71) Applicant: HITACHI ASTEMO FRANCE, Drancy (FR)

(72) Inventors: Lennart Witte, Strasbourg (FR); Alex Patrão Carqueijó, Pantin (FR)

(73) Assignee: HITACHI ASTEMO FRANCE S.A.S, Drancy (FR)

( * ) Notice: Subject to any disclaimer, the term of this patent is extended or adjusted under 35 U.S.C. 154(b) by 360 days.

(21) Appl. No.: 17/438,765

(22) PCT Filed: Mar. 2, 2020

(86) PCT No.: PCT/FR2020/050411
§ 371 (c)(1),
(2) Date: Sep. 13, 2021

(87) PCT Pub. No.: WO2020/188175
PCT Pub. Date: Sep. 24, 2020

(65) Prior Publication Data
US 2022/0153243 A1 May 19, 2022

(30) Foreign Application Priority Data
Mar. 18, 2019 (FR) ........................... 1902761

(51) Int. Cl.
*B60T 13/74* (2006.01)
*B60T 8/171* (2006.01)
(Continued)

(52) U.S. Cl.
CPC ............. *B60T 8/171* (2013.01); *B60T 8/172* (2013.01); *B60T 13/746* (2013.01); *H02P 29/60* (2016.02);
(Continued)

(58) Field of Classification Search
CPC .... B60T 13/662; B60T 13/746; B60T 13/741; B60T 8/171; B60T 8/172; H02P 29/60;
(Continued)

(56) References Cited

U.S. PATENT DOCUMENTS 11,311,294 B2 * 4/2022 Swayze ................ A61B 17/105
2016/0103430 A1 4/2016 Baehrle-Miller et al.
(Continued)

FOREIGN PATENT DOCUMENTS

DE 102006052810 A1 5/2008
DE 102009001258 A1 9/2010
DE 102012205030 A1 10/2013

OTHER PUBLICATIONS

Pugachev et al., Experimental investigation of thermal processes in induction motor by physical modelling, 2015, IEEE, p. 1-5 (Year: 2015).*

(Continued)

*Primary Examiner* — Mcdieunel Marc
(74) *Attorney, Agent, or Firm* — Pearne & Gordon LLP

(57) ABSTRACT

A vehicle wheel control device is configured to determine a first corrective coefficient of temperature of the motor from a ratio of an angular speed of the motor to the supply intensity of the motor depending on the supply voltage of the motor. The control device is configured to determine a second corrective coefficient of temperature of the motor from a ratio of the ohmic resistance of the motor to the constant of the motor depending on the temperature of the motor.

11 Claims, 4 Drawing Sheets

(51) Int. Cl.
  *H02P 29/60* (2016.01)
  *B60T 8/172* (2006.01)
  *F16D 66/00* (2006.01)
  *F16D 121/24* (2012.01)

(52) U.S. Cl.
  CPC .. *F16D 2066/001* (2013.01); *F16D 2066/006* (2013.01); *F16D 2121/24* (2013.01)

(58) Field of Classification Search
  CPC .. H02P 23/14; F16D 55/226; F16D 2066/006; F16D 2066/001; F16D 2121/24
  See application file for complete search history.

(56) References Cited

U.S. PATENT DOCUMENTS

| | | |
|---|---|---|
| 2020/0269824 A1 | 8/2020 | Witte |
| 2021/0001836 A1 | 1/2021 | Witte et al. |
| 2022/0153243 A1* | 5/2022 | Witte .................... B60T 13/662 |

OTHER PUBLICATIONS

Jacazio et al., A prognostics model for detecting the irreversibility margin of non-reversible electromechanical actuators, 2008, IEEE, p. 1-7 (Year: 2008).*
Ki et al., A new type of clamping force estimator for electromechanical brake systems, 2010, IEEE, p. 933-937 (Year: 2010).*
Sawata et al., Thermal Modeling of Brushless DC Motor and Brake Solenoid in Electro-Mechanical Actuators for the More Electric Aircraft Engine, 2007, IEEE, p. 1236-1241 (Year: 2007).*
Specification and drawings for U.S. Appl. No. 17/291,453 entitled "Motor Vehicle Control Module and Method, Comprising an Evaluation of Rear Wheel Speed Based On the Front Wheels Only" filed May 5, 2021.
Search Report for French application No. FR1902761 dated Dec. 3, 2019.
International Search Report for PCT/FR2020/050411 dated Sep. 30, 2020 and translation thereof.
Written Opinion for PCT/FR2020/050411 dated Sep. 30, 2020.

* cited by examiner

ESTIMATION OF THE TEMPERATURE OF AN ELECTRIC MOTOR OF A VEHICLE BRAKE ACTUATOR AND CONTROL OF THE MOTOR

CROSS-REFERENCE TO RELATED APPLICATIONS

This is a National Stage of PCT international application PCT/FR2020/050411, filed on Mar. 2, 2020, which claims the priority of French Patent Application No. 1902761, filed Mar. 18, 2019, both of which are incorporated herein by reference in their entirety.

TECHNICAL FIELD

The invention relates to vehicle brakes. It relates more specifically to the control of an electromechanical brake actuator, from the temperature of an actuator motor.

BACKGROUND OF THE INVENTION

Floating calliper brakes comprise an electromechanical actuator that is connected to the calliper. The electromechanical actuator comprises an electric motor.

Some of these brakes are equipped with a temperature sensor. The actuator motor is then controlled taking into account the temperature of the motor. The braking force exerted by the brake then tends to be more precise.

There is a need to limit the influence of the motor temperature on the braking performances, in particular in the absence of a brake temperature sensor.

DESCRIPTION OF THE INVENTION

In this regard, the invention relates to a method for controlling a vehicle brake, the brake comprising an electromechanical actuator which includes an electric motor. The control method comprises controlling the actuator from the estimated temperature of the motor, the temperature of the motor being estimated from the motor constant and the ohmic resistance of the motor.

According to the invention, the method for controlling the brake comprises a step of determining a first temperature corrective coefficient of the motor, on the basis of a first function which is representative of a ratio of an angular speed of the motor to the supply current of the motor as a function of the supply voltage of the motor.

In addition or alternatively, the method for controlling the brake comprises a step of determining a second temperature corrective coefficient of the motor, on the basis of a second function which is representative of a ratio of the ohmic resistance of the motor to the motor constant as a function of the temperature of the motor.

By estimating the temperature of the electric motor, at the first temperature corrective coefficient and/or the second temperature corrective coefficient, the influence of the temperature of the electric motor on the braking performances is limited, including in the absence of a brake temperature sensor. The electric motor and more generally the actuator are controlled taking into account the estimated temperature of the electric motor. The braking force which is exerted by the brake is also estimated more precisely by taking into account the temperature of the electric motor, in particular by means of the first temperature corrective coefficient and/or the second temperature corrective coefficient.

Consequently, the mass, power and cost of the electromechanical brake actuator can be limited. Braking tends to be more efficient by more precisely controlling the braking force that is exerted by the brake.

The invention may optionally include one or more of the following features, whether or not combined with each other.

According to a particular embodiment, the control method comprises controlling the motor so that the brake exerts a braking force according to a braking setpoint, the braking force exerted by the brake being estimated from the temperature of the motor.

According to a particular embodiment, the braking force exerted by the brake is estimated from the first corrective coefficient and/or from the second corrective coefficient.

According to a particular embodiment, the first function and/or the second function are configured to be linear.

According to a particular embodiment, the motor constant and/or the ohmic resistance of the motor are estimated from the supply voltage of the motor and the supply current of the motor.

The invention also relates to a device for controlling a vehicle brake, the brake comprising an electromechanical actuator which includes an electric motor. The control device is configured to control the electromechanical actuator from the temperature of the electric motor of the actuator, the temperature of the motor being estimated from the motor constant and the ohmic resistance of the motor.

According to the invention, the control device is configured to determine a first temperature corrective coefficient of the motor, on the basis of a first function which is representative of a ratio of an angular speed of the motor to the supply current of the motor as a function of the supply voltage of the motor.

In addition or alternatively, the control device is configured to determine a second temperature corrective coefficient of the motor, on the basis of a second function which is representative of a ratio of the ohmic resistance of the motor to the motor constant as a function of the temperature of the motor.

The invention also relates to a motor vehicle brake, the brake comprising an electromechanical actuator and a control device as defined above. The control device is configured to control the actuator of the brake.

According to a particular embodiment, the control device is configured to control the motor so that the brake exerts a braking force according to a braking setpoint, the braking force exerted by the brake being estimated from the temperature of the motor.

BRIEF DESCRIPTION OF THE DRAWINGS

The present invention will be better understood upon reading the description of exemplary embodiments, with reference to the appended drawings wherein.

DETAILED DESCRIPTION OF PARTICULAR EMBODIMENTS

Figure 1:
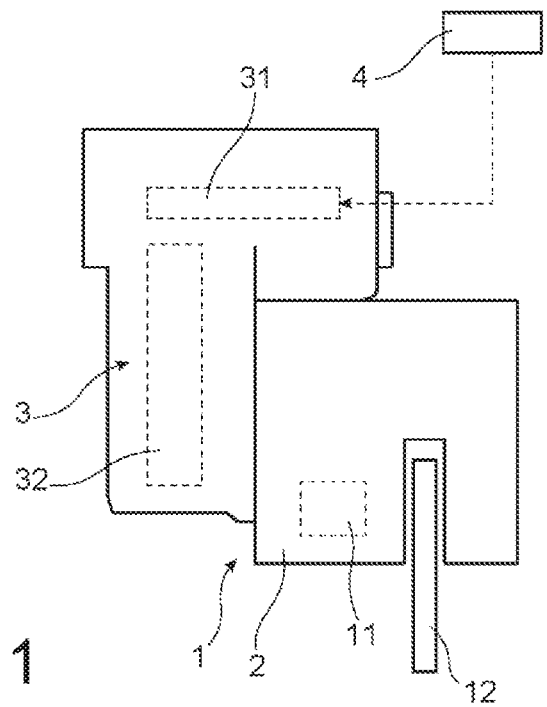
FIG. 1 is a partial schematic representation of a vehicle brake, according to a first embodiment of the invention.

Identical, similar or equivalent parts of the different figures bear the same reference numerals so as to facilitate the passage from one figure to another.

FIG. 1 shows a disc brake 1 for a motor vehicle. The disc brake 1 includes a calliper 2 advantageously of the floating type, a yoke (not shown), an electromechanical actuator 3, two pads (not shown) and a disc 12. The brake 1 also includes a piston 11 and a device 4 for controlling the actuator. The brake 1 is in particular a parking brake.

In a first variant embodiment, the brake according to the present invention includes a hydraulic actuator (typically cylinder/piston) for the service brake and an electromechanical actuator for the parking and/or emergency brake. In a second variant embodiment, all the brake actuators are electric or electromechanical. Advantageously, a single electromechanical actuator provides the service, parking and/or emergency braking.

The piston 11 is housed in the calliper 2. It is movable in translation relative to the calliper 2, to bring the pads (not shown) which clamp the disc 12 during braking closer together.

The electromechanical actuator 3 is connected to the yoke 2. The electromechanical actuator 3 comprises an electric motor 31, a transmission device 32 and a case 34 which houses the motor 31 and the transmission device 32.

The operation of the motor 31 is described by the five equations below:

$$L\frac{di(t)}{dt} = -Ri(t) - K\omega(t) + u(t) \quad (1)$$

$$J\frac{d\omega(t)}{dt} = Ki(t) - M_L(t) \quad (2)$$

$$M_L(t) = M_F + M_C(t) \quad (3)$$

$$\frac{dS(t)}{dt} = \gamma\omega(t) \quad (4)$$

$$u(t) = Ri(t) + K\omega(t) \quad (5)$$

In these equations, u represents the supply voltage of the motor, i represents the supply current of the motor, L represents the motor inductance, R represents the ohmic resistance of the motor, K represents the motor constant, J represents the moment of inertia of the motor, $\omega$ represents the angular speed of the motor, $M_L$ represents the motor output torque, $M_C$ represents the motor loading torque, $M_F$ represents the motor friction torque, and S represents the displacement of the piston.

The transmission device 32 is connected to the piston 11. It comprises a plurality of movement transmission elements such as toothed wheels. The transmission device 32 is configured to displace the piston 11, when it is driven by the motor 31.

The control device 4 comprises at least one control unit. The control device 4 controls the operation of the motor 31, for example by means of a data transmission network, a wireless connection or a power supply cable. The control device 4 is adapted to the type of motor 31 used (motor with brush and/or motor without brush or the like). It advantageously includes switching means including, for example, power transistors or the like, advantageously controlled by a digital computer.

In the embodiment shown, each control unit is located outside the case 34 of the actuator. Each control unit comprises for example a computing unit. The computing unit is for example formed by the computer of the vehicle stability device, for example known under the trademark "ESP", of a central computer dedicated to braking, of a digital computer shared with other functions of the vehicle and/or a computer integrated in the brake 1.

Figure 2:
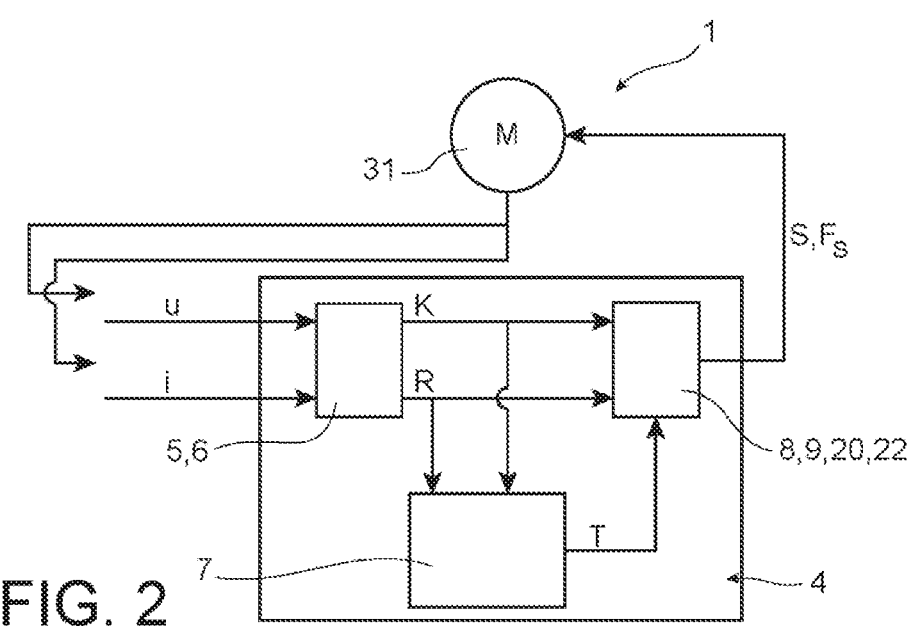
FIG. 2 is a partial schematic representation of the actuator and an actuator control device, according to the first embodiment of the invention.
Figure 3:
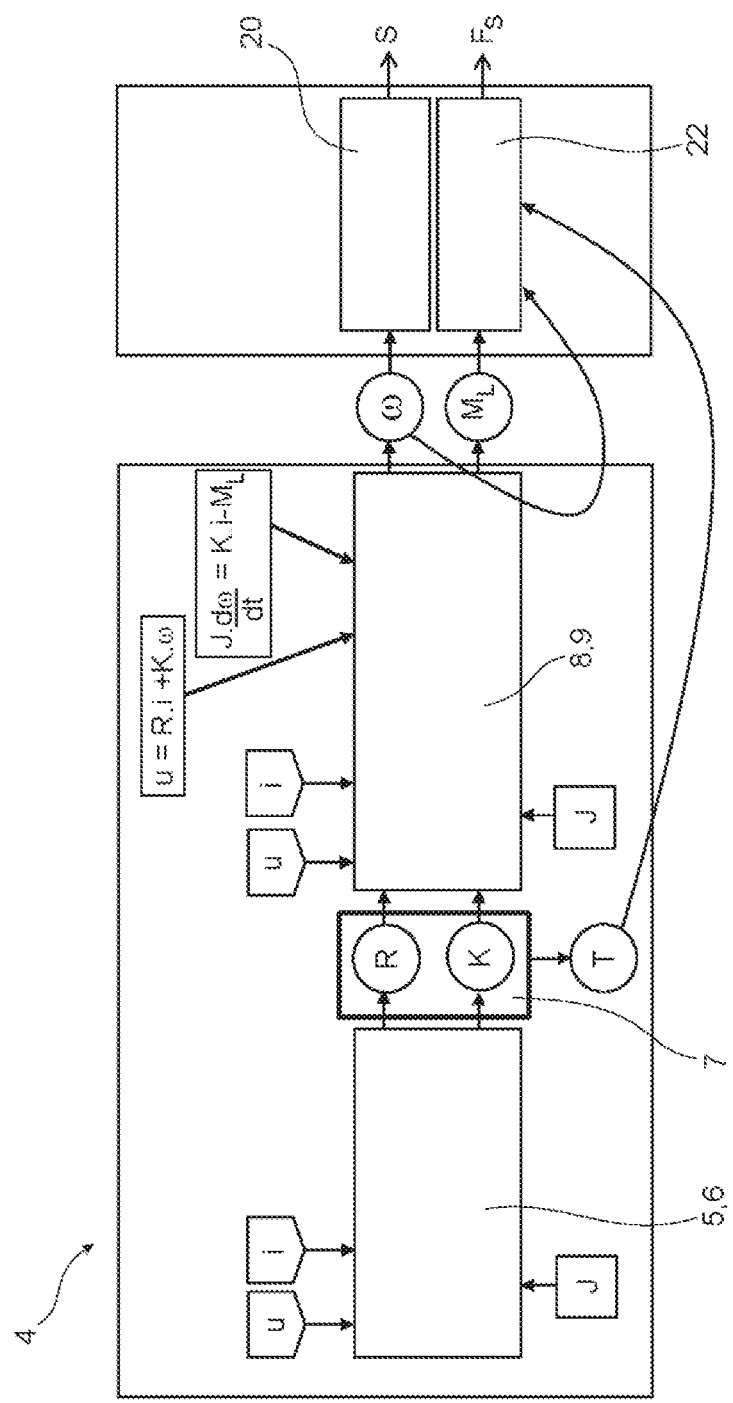
FIG. 3 is a partial schematic representation of the actuator control device, according to the first embodiment.

With joint reference to FIGS. 2 and 3, the control device 4 comprises a device 5 for estimating the resistance of the motor, a device 6 for estimating the motor constant, a device 7 for estimating the temperature of the motor, a device 8 for estimating the angular speed of the motor, a device 9 for estimating the motor output torque, a device 20 for estimating the displacement of the piston, and a device 22 for estimating the braking force.

With joint reference to FIGS. 2 and 3, the control device 4 is configured to control the electromechanical actuator 3, from the temperature T of the electric motor of the actuator which is estimated by the device 7 for estimating the temperature.

The temperature estimation device 7 is configured to estimate the temperature T of the motor 31, from the constant K of the motor and the ohmic resistance R of the motor. In particular, the constant K of the motor tends to decrease when the temperature T of the motor increases. The ohmic resistance R of the motor tends to increase when the temperature T of the motor increases.

The constant K of the motor and the ohmic resistance R are moreover liable to vary with the ageing of the electric motor 31. The resistance estimation device 5 is configured to estimate the ohmic resistance R of the electric motor, from the supply voltage u of the motor and the supply current i of the motor. The device 6 for estimating the motor constant is configured to estimate the constant K of the electric motor, from the supply voltage u of the motor and the supply current i of the motor. The value of the moment of inertia J of the motor is known when determining the constant K and the ohmic resistance R of the motor.

The constant K of the motor and the ohmic resistance R of the motor are for example estimated in two steps using the estimation method which is disclosed in patent application US 2016/0103430 by means of the five equations above which are representative of the behaviour of the electric motor 31.

In parallel or after the temperature T of the motor has been estimated, the angular speed estimation device 8 estimates the angular speed $\omega$ of the motor. The device 9 for estimating the motor output torque estimates the motor output torque $M_L$. Equations (2) and (5) above are for example used to estimate the angular speed $\omega$ of the motor and the output torque $M_L$ of the motor, knowing that the ohmic resistance R, the constant K of the motor, the supply voltage u of the motor, and the supply current i of the motor are then known.

Once the angular speed $\omega$ of the motor and the output torque $M_L$ of the motor have been estimated, the control device 4 establishes a first temperature corrective coefficient $\alpha_1$ of the motor and a second temperature corrective coefficient $\alpha_2$ of the motor.

Figure 4:
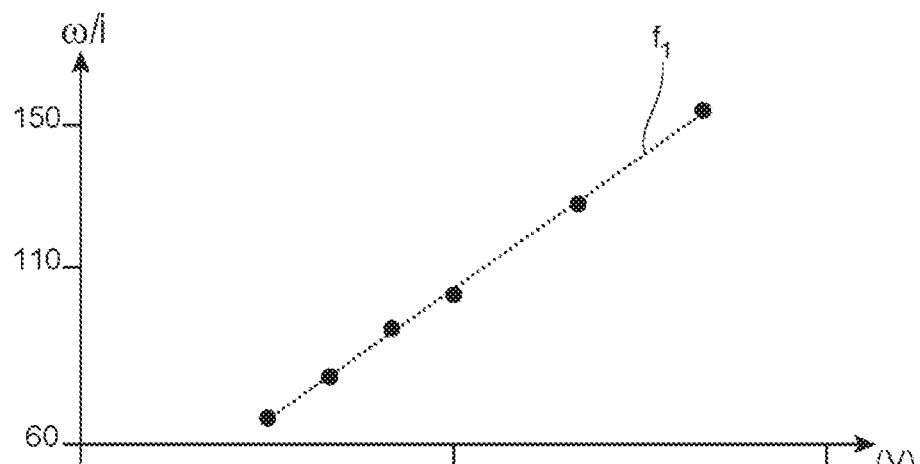
FIG. 4 is a partial schematic representation of a ratio of an angular speed of the motor to a current supplied to the motor, as a function of a supply voltage of the motor.

With reference more specifically to FIG. 4, the first corrective coefficient $\alpha_1$ is established from a first function $f_1$. The first function $f_1$ is configured to be substantially linear. It relates the ratio of the angular speed $\omega$ of the motor to the current i which supplies the motor 31 as a function of the supply voltage u of the motor. The first corrective coefficient $\alpha_1$ is used subsequently to estimate the braking force $F_S$ which is exerted by the brake 1, taking into account the influence of the temperature of the motor 31 on the braking force $F_S$.

Figure 5:
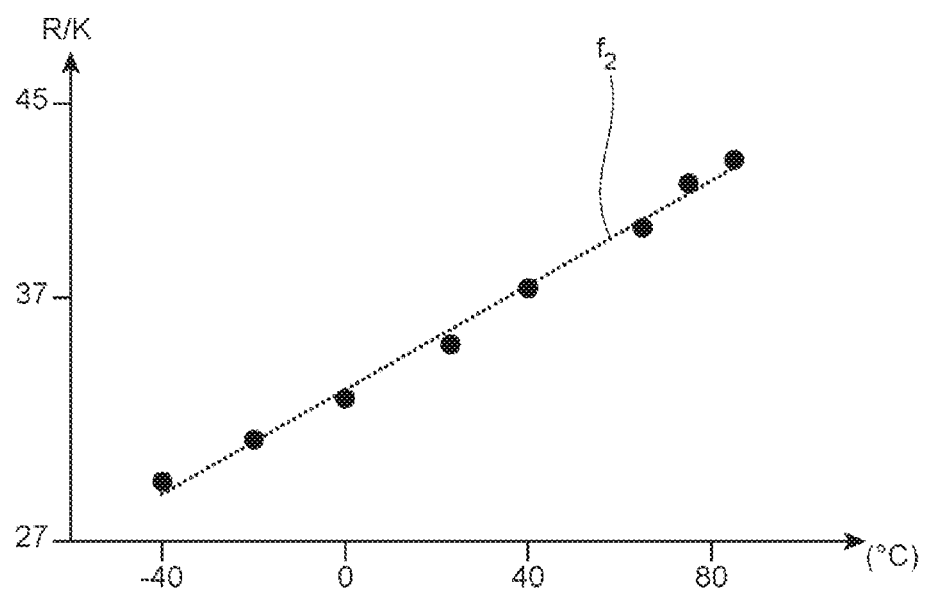
FIG. 5 is a partial schematic graphical representation of a ratio of an ohmic resistance of the motor to a constant of the motor, as a function of a temperature of the motor.

With reference more specifically to FIG. 5, the second corrective coefficient $\alpha_2$ is established from a second function $f_2$. The second function $f_2$ is configured to be substantially linear. It relates the ratio of the ohmic resistance R of the motor to the constant K of the motor as a function of the temperature T of the motor. The second corrective coefficient $\alpha_2$ is used subsequently to estimate the braking force $F_S$ which is exerted by the brake 1, taking into account the influence of the temperature T of the motor 31 on the braking force $F_S$.

Referring again to FIG. 3, the device 20 for estimating the displacement of the piston is configured to estimate the displacement S of the piston from the angular speed $\omega$ of the motor. The displacement S of the piston depends on the reduction rate of the transmission device 32 and on the reduction rate of the transmission elements which are housed in the calliper 2. Since the displacement S of the piston depends little on the temperature T of the motor, the displacement S of the piston is estimated without a corrective coefficient related to the temperature of the motor, such as the first corrective coefficient $\alpha_1$ or the second corrective coefficient $\alpha_2$, in the embodiment shown. Such a device 20 for estimating the displacement of the piston is known per se.

The estimation device 22 for estimating the braking force is configured to estimate the braking force $F_S$ which is exerted by the brake 1 on the corresponding vehicle wheel. In the embodiment shown, the braking force $F_S$ corresponds to a clamping force exerted by the pads (not shown) on the disc 12. The braking force $F_S$ is estimated from the angular speed $\omega$ of the motor, the output torque $M_L$ of the motor and the temperature T of the motor. The temperature T of the motor is in particular taken into account by means of the first corrective coefficient $\alpha_1$ and the second corrective coefficient $\alpha_2$, to estimate the braking force $F_S$.

Figure 6:
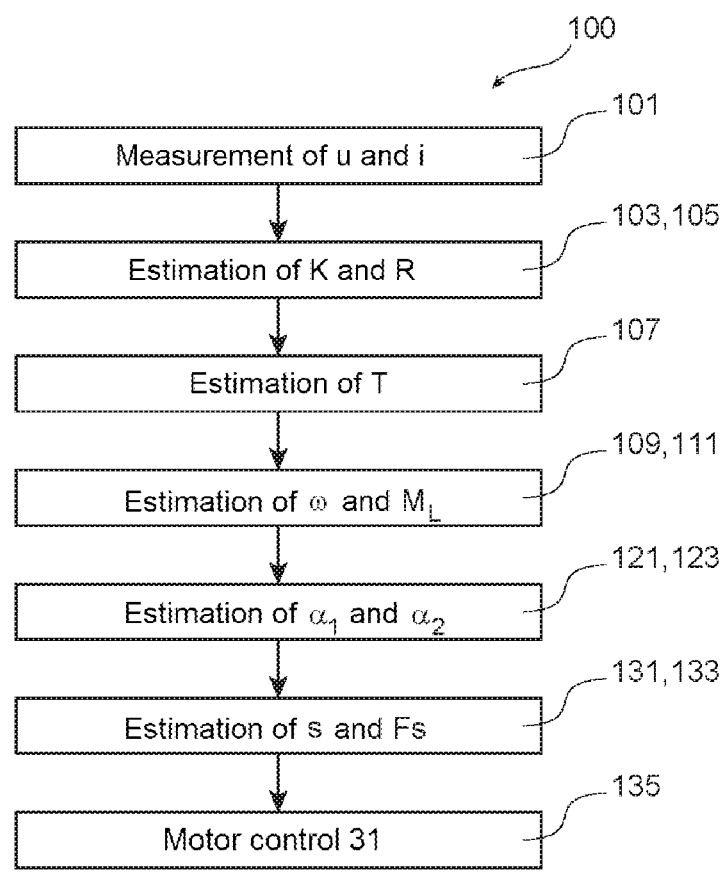
FIG. 6 illustrates the method for controlling the brake, according to the first embodiment.

The method for controlling the brake 1 is illustrated with reference to FIGS. 3 and 6. The control method 100 is carried out by means of the control device 4 which was described above. The control method 100 aims at controlling the operation of the electric motor 31 of the actuator from the estimated temperature T of the motor, in step 135.

The control method 100 comprises an initial step 101 of determining the supply voltage u of the motor 31, the supply current i of the motor, and the moment of inertia J of the motor. The moment of inertia J of the motor is known, for example from the specifications of the electric motor 31. The supply voltage u and the supply current i are measured at different times, for example at regular intervals.

The control method 100 continues with a step 103 of estimating the constant K of the motor from the supply voltage u of the motor and the supply current i of the motor which have been measured. In parallel, the control method 100 comprises a step 105 of estimating the ohmic resistance R of the motor from the supply voltage u of the motor and from the supply current i of the motor.

The control method 100 then comprises a step 107 of estimating the temperature T of the electric motor, from the ohmic resistance R and the constant K of the motor, by means of the temperature estimation device 7. The step 107 of estimating the temperature T is also referred to as the method for estimating the motor temperature T in this document.

The control method 100 comprises a step 109 of estimating the angular speed $\omega$ of the motor, from the supply voltage u of the motor, the supply current i of the motor, the moment of inertia J of the motor, the ohmic resistance R of the motor, and the constant K of the motor. In parallel, the control method 100 comprises a step 111 of estimating the output torque $M_L$ of the motor, from the supply voltage u of the motor, the supply current i of the motor, the moment of inertia J of the motor, the ohmic resistance R of the motor, and the constant K of the motor.

The control method 100 comprises a step 131 of estimating the displacement S of the piston, from the angular speed $\omega$ of the motor, by means of the device 20 for estimating the displacement of the piston. In parallel, the control method 100 comprises a step 133 of estimating the braking force $F_S$, from the angular speed $\omega$ of the motor, the output torque $M_L$ of the motor and the temperature T of the motor, by means of the braking force estimation device 22.

The control method 100 ends with the step 135 for controlling the operation of the motor 31. The control device 4 controls in particular the supply voltage u of the motor and the supply current i of the motor. The motor 31 then rotates with an angular speed $\omega$ and produces an output torque $M_L$, so that the piston 11 displaces by a setpoint value S and that the brake 1 exerts a braking force $F_S$ according to a braking setpoint.

Of course, various modifications can be made by the person skilled in the art to the invention which has just been described without departing from the scope of the description of the invention.

In an embodiment not shown, the brake 1 is a drum brake which comprises the electromechanical actuator 3 and the control device 4 of the actuator.

In another embodiment not shown, the brake 1 is a fixed calliper brake instead of a floating calliper brake.

The displacement s of the piston 11 can be estimated by the control device 4 from the temperature T of the motor 31.

Alternatively or in addition, the constant K of the motor, the ohmic resistance R of the motor, and/or the angular speed $\omega$ of the motor are measured, instead of being estimated from the supply voltage u and the supply current i of the motor.

The control device 4 can control the operation of the motor 31 by means of other parameters, for example by taking more into account the wear of the motor 31 or the transmission device 32 and/or the friction.

Other types of corrective coefficients than the first corrective coefficient $\alpha_1$ and the second corrective coefficient $\alpha_2$ can be used.

The first function $f_1$ and the second function $f_2$ can each be configured in a non-linear manner, for example polynomials, to be more precise.

NOMENCLATURE WITH REFERENCE TO FIGURES

1: disc brake
2: calliper
3: electromechanical actuator
4: control device
5: device for estimating the motor resistance
6: device for estimating the motor constant
8: device for estimating the angular speed of the motor
9: device for estimating the motor torque 11: piston
12: disc
20: device for estimating the displacement of the piston
22: device for estimating the braking force
31: electric motor
32: transmission device
34: actuator case
T: temperature of the electric motor
K: motor constant
R: motor resistance
L: motor inductance
u: supply voltage of the motor
i: supply current of the motor
J: moment of inertia of the motor
ω: angular speed of the motor
$M_L$: motor output torque
$M_c$: motor loading torque
$M_F$: motor friction torque
S: displacement of the piston
$F_S$: braking force exerted by the brake
$f_1$: first function
$\alpha_1$: first temperature corrective coefficient of the motor
$f_2$: second function
$\alpha_2$: second temperature corrective coefficient of the motor

What is claimed is:

1. A control method for controlling a vehicle brake, the brake comprising an electromechanical actuator which includes an electric motor, the method comprising:
controlling the actuator from the temperature of the motor, wherein the temperature of the motor is estimated from the motor constant and the ohmic resistance of the motor,
wherein:
the control method further comprises a step of determining a first temperature corrective coefficient of the motor, on the basis of a first function which is representative of a ratio of an angular speed of the motor to the supply current of the motor as a function of the supply voltage of the motor, and/or
the control method for controlling the brake further comprises a step of determining a second temperature corrective coefficient of the motor, on the basis of a second function which is representative of a ratio of the ohmic resistance of the motor to the motor constant as a function of the temperature of the motor.

2. The control method according to claim 1, further comprising controlling the motor so that the brake exerts a braking force according to a braking setpoint, wherein the braking force exerted by the brake is estimated from the temperature of the motor.

3. The control method according to claim 2, wherein the braking force exerted by the brake is estimated from the first corrective coefficient and/or from the second corrective coefficient.

4. The control method according to claim 1, wherein the first function and/or the second function are configured to be linear.

5. The control method according to claim 1, wherein the motor constant and/or the ohmic resistance of the motor are estimated from the supply voltage of the motor and the supply current of the motor.

6. A control device for controlling a vehicle brake, the brake comprising an electromechanical actuator which includes an electric motor,
wherein the control device is configured to control the electromechanical actuator from the temperature of the electric motor of the actuator, wherein the temperature of the motor is estimated from the motor constant and the ohmic resistance of the motor,
wherein:
the control device is configured to determine a first temperature corrective coefficient of the motor, on the basis of a first function which is representative of a ratio of an angular speed of the motor to the supply current of the motor as a function of the supply voltage of the motor, and/or
the control device is configured to determine a second temperature corrective coefficient of the motor, on the basis of a second function which is representative of a ratio of the ohmic resistance of the motor to the motor constant as a function of the temperature of the motor.

7. The control device according to claim 6, wherein the first function and/or the second function are configured to be linear.

8. The control device according to claim 6, wherein the motor constant and/or the ohmic resistance of the motor are estimated from the supply voltage of the motor and the supply current of the motor.

9. A brake for a motor vehicle, the brake comprising an electromechanical actuator and a control device according to claim 6, wherein the control device is configured to control the actuator of the brake.

10. The brake according to claim 9, wherein the control device is configured to control the motor so that the brake exerts a braking force according to a braking setpoint, wherein the braking force exerted by the brake is estimated from the temperature of the motor.

11. The brake according to claim 9, wherein the braking force exerted by the brake is estimated from the first corrective coefficient and/or from the second corrective coefficient.

* * * * *